(12) United States Patent
Lam et al.

(10) Patent No.: US 8,385,031 B2
(45) Date of Patent: Feb. 26, 2013

(54) APPARATUS AND METHOD FOR PROVIDING POWER FROM A POWER SOURCE TO A PORTABLE ELECTRICAL DEVICE

(75) Inventors: Vincent Man Tai Lam, Hong Kong (HK); Ko Chuk, Hong Kong (HK); Alan Man Lung Lam, Hong Kong (HK)

(73) Assignee: RadioShack Corporation, Fort Worth, TX (US)

( * ) Notice: Subject to any disclaimer, the term of this patent is extended or adjusted under 35 U.S.C. 154(b) by 504 days.

(21) Appl. No.: 12/701,529

(22) Filed: Feb. 6, 2010

(65) Prior Publication Data

US 2011/0193411 A1  Aug. 11, 2011

(51) Int. Cl.
*H02H 7/00* (2006.01)
*H02H 9/00* (2006.01)

(52) U.S. Cl. ......................... 361/18; 307/10.1

(58) Field of Classification Search .............. 307/10.1; 361/18

See application file for complete search history.

(56) References Cited

U.S. PATENT DOCUMENTS

| | | | |
|---|---|---|---|
| 6,842,356 B2 * | 1/2005 | Hsu ........................... 363/146 |
| 2009/0033149 A1 * | 2/2009 | Patel ........................... 307/10.1 |
| 2009/0108825 A1 * | 4/2009 | Yang et al. .................... 323/288 |
| 2010/0219790 A1 * | 9/2010 | Chadbourne et al. ......... 320/107 |

* cited by examiner

*Primary Examiner* — Rexford Barnie
*Assistant Examiner* — Christopher Clark
(74) *Attorney, Agent, or Firm* — Law Office of Donald D Mondul (57) ABSTRACT

An apparatus for providing power from a vehicle power source to at least one portable electrical device includes: (a) a power interface unit for coupling with the vehicle power source; (b) a power converter unit coupled with the power interface unit; (c) at least one first voltage output connection structure coupled with the power converter unit; the at least one first voltage connection structure presenting at least one first voltage output; the at least one first voltage output connection structure being configured for effecting universal serial bus coupling; and (d) first short-circuit protection circuitry coupled with the power converter unit and the at least one first voltage output connection structure.

16 Claims, 5 Drawing Sheets

APPARATUS AND METHOD FOR PROVIDING POWER FROM A POWER SOURCE TO A PORTABLE ELECTRICAL DEVICE

FIELD

The present invention is directed to providing power for portable electrical devices, and especially to providing power from a vehicle power source to a portable electrical device.

BACKGROUND

Portable electric devices are proliferating in society at a significant rate. By way of example and not by way of limitation, Compact Disc (CD) players, Digital Video Discs (DVD) players, video game units and many other portable electric devices are in widespread use. Portable electric devices are often powered using rechargeable batteries, and it is convenient to recharge the batteries when away from home, office or another location at which one may plug in a charger to a wall receptacle or similar electricity source. Many portable electric devices may be connected with a power source using a Universal Serial Bus (USB) connector.

Some power connector devices are configured to permit accessing battery power from a rechargeable battery source such as, by way of example and not by way of limitation, an automobile battery. Access may be effected using a power connector configured for insertion into a cigarette lighter receptacle or similar receptacle in an automobile. Access to car battery power by such devices has heretofore been carried out substantially without short-circuit protection or thermal protection.

There is a need for an apparatus and method for providing power from a power source to a portable electrical device that can provide short-circuit protection.

There is a need for an apparatus and method for providing power from a power source to a portable electrical device that can provide thermal protection.

SUMMARY OF THE INVENTION

An apparatus for providing power from a vehicle power source to at least one portable electrical device includes: (a) a power interface unit for coupling with the vehicle power source; (b) a power converter unit coupled with the power interface unit; (c) at least one first voltage output connection structure coupled with the power converter unit; the at least one first voltage connection structure presenting at least one first voltage output; the at least one first voltage output connection structure being configured for effecting universal serial bus coupling; and (d) first short-circuit protection circuitry coupled with the power converter unit and the at least one first voltage output connection structure.

An apparatus for providing power from a direct current power source to at least one portable direct current electrical device includes: (a) a power interface unit for coupling with the direct current power source; (b) a direct current-to-direct current power converter unit coupled with the power interface unit; (c) at least one first voltage output connection structure coupled with the power converter unit; the at least one first voltage connection structure presenting at least one first voltage output; the at least one first voltage output connection structure being configured for effecting universal serial bus coupling; and (d) first short-circuit protection circuitry coupled with the power converter unit and the at least one first voltage output connection structure.

A method for providing power from a vehicle power source to at least one portable electrical device includes: (a) providing a power interface unit for coupling with the vehicle power source; (b) providing a power converter unit coupled with the power interface unit; (c) providing at least one first voltage output connection structure coupled with the power converter unit; the at least one first voltage connection structure presenting at least one first voltage output; (d) providing first short-circuit protection circuitry coupled with the power converter unit and the at least one first voltage output connection structure; and (e) configuring and operating the at least one first voltage output connection structure for effecting universal serial bus coupling.

The method may further include: (f) providing at least one second voltage output connection structure coupled with the power converter unit; the at least one second voltage connection structure presenting at least one second voltage output; (g) providing second short-circuit protection circuitry coupled with the power converter unit and the at least one second voltage output connection structure; and (h) configuring and operating the at least one second voltage output connection structure for effecting coupling for charging a mobile phone.

It is, therefore, a feature of the present invention to provide an apparatus and method for providing power from a power source to a portable electrical device that can provide short-circuit protection.

It is a further feature of the present invention to provide an apparatus and method for providing power from a power source to a portable electrical device that can provide thermal protection.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
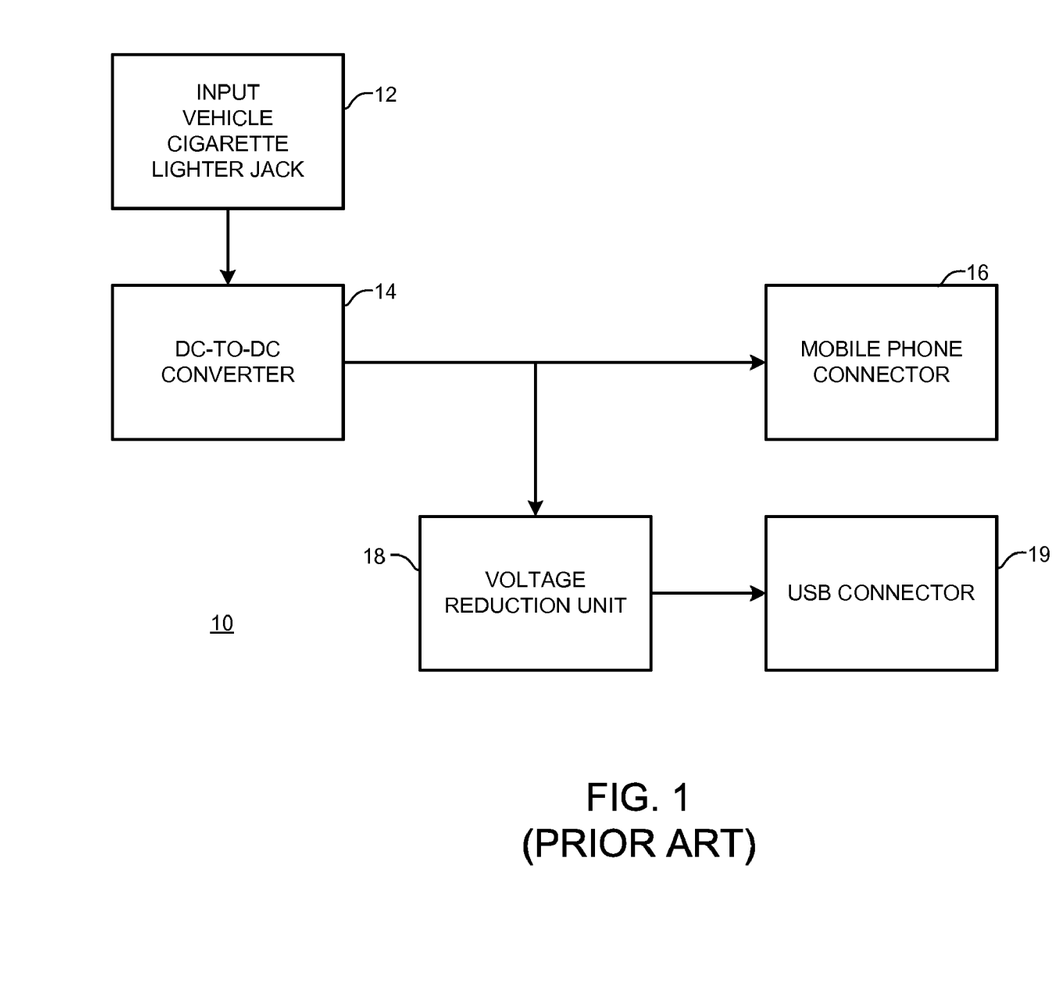
FIG. 1 is a block diagram representing a prior art apparatus for providing power from a vehicle power source to a portable electrical device.

FIG. 1 is a block diagram representing a prior art apparatus for providing power from a vehicle power source to a portable electrical device. In FIG. 1, a vehicle power charging system 10 includes an input unit 12 preferably configured for insertion in a vehicle cigarette lighter socket for accessing power from a vehicle electrical system. Input unit 12 is coupled with a Direct Current-to-Direct Current (DC-to-DC) converter unit 14. DC-to-DC converter unit 14 is connected with a mobile phone connector unit 16. Mobile phone connector unit 16 is configured for coupling with a charging port of a mobile phone. DC-to-DC converter unit 14 is preferably configured to convert power received via input unit 12 to a voltage appropriate for mobile phone charging for presentation at mobile phone connector unit 16.

DC-to-DC converter unit 14 is also connected with a voltage reduction unit 18. Voltage reduction unit 18 is coupled with a USB connector unit 19. USB connector unit 19 is configured for coupling with a charging port of a portable electric device. USB operation may be effected according to a predetermined standard. Voltage reduction unit 18 is preferably configured to convert power received from DC-to-DC converter unit 14 to a voltage appropriate for USB operation for presentation at USB connector unit 19.

Prior art vehicle power charging system 10 may exhibit some disadvantages, such as varying of output voltage at mobile phone connector unit 16 and at USB connector unit 19 under different loading currents. When two devices are attached with vehicle power charging system 10 one or both of mobile phone connector unit 16 and USB connector unit 19 may not effect charging of a connected device. Further, if either of mobile phone connector unit 16 and USB connector unit 19 is short-circuited, DC-to-DC converter unit 14 may shut down with a result that no output will be provided at either of mobile phone connector unit 16 and USB connector unit 19 for charging.

Figure 2:
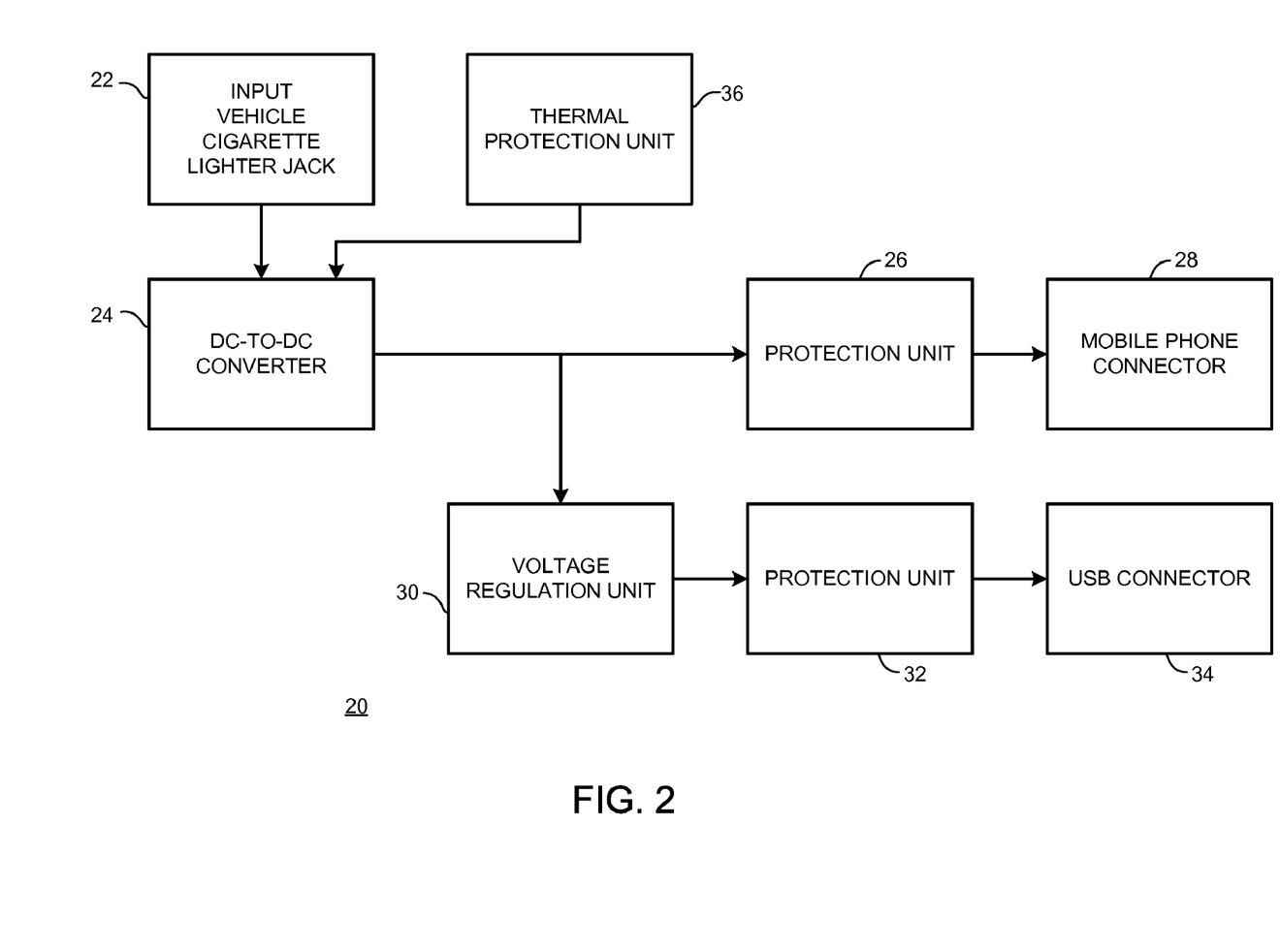
FIG. 2 is a block diagram representing an apparatus for providing power from a vehicle power source to a portable electrical device configured according to the teachings of the present invention.

FIG. 2 is a block diagram representing an apparatus for providing power from a vehicle power source to a portable electrical device configured according to the teachings of the present invention. In FIG. 2, a vehicle power charging system 20 includes an input unit 22 preferably configured for insertion in a vehicle cigarette lighter socket for accessing power from a vehicle electrical system.

Input unit 22 is coupled with a DC-to-DC converter unit 24. DC-to-DC converter unit 24 is coupled with a short-circuit protection unit 26 and a mobile phone connector unit 28. Mobile phone connector unit 28 is configured for coupling with a charging port of a mobile phone. DC-to-DC converter unit 24 is preferably configured to convert power received via input unit 22 to a voltage appropriate for mobile phone charging for presentation at mobile phone connector unit 28. Short-circuit protection unit 26 provides short-circuit protection to devices coupled with mobile phone connector unit 28.

DC-to-DC converter unit 24 is also connected with a voltage regulation unit 30. Voltage regulation unit 30 is coupled with a short-circuit protection unit 32 and a USB connector unit 34. USB connector unit 34 is configured for coupling with a charging port of a portable electric device. USB operation may be effected according to a predetermined standard known by those ordinarily skilled in the art. Voltage regulation unit 30 is preferably configured to convert power received from DC-to-DC converter unit 24 to a voltage appropriate for USB operation according to a USB standard for presentation at USB connector unit 34. Short-circuit protection unit 32 provides short-circuit protection to devices coupled with USB connector unit 34. Voltage regulation unit 30 may be embodied in a low-dropout voltage regulator. DC-to-DC converter unit 24 may be designed to present an output of 800 mA to 1.25 A to ensure that both phone connector unit 28 and USB connector unit 34 will have sufficient current to properly carry out charging operations, including simultaneous charging operations, when portable electrical devices are connected to both phone connector unit 28 and USB connector unit 34.

Short-circuit protection unit 26, 32 may be designed to provide different levels of protection depending upon what downstream elements are being protected. By way of example and not by way of limitation, short-circuit protection unit 26 may protect mobile phone connector unit 28 at a first level (e.g., 700 mA (milli-amperes)) in order to ensure that charging current for an attached phone will not exceed a first specified limit. Short-circuit protection unit 32 may protect USB connector unit 34 at a second level (e.g., 550 mA) in order to ensure that charging current for an attached device will not exceed a second specified limit. Independent short-circuit protection for mobile phone connector unit 28 and USB connector unit 34 may ensure that a short-circuit at one of mobile phone connector unit 28 and USB connector unit 34 will not affect operation of the other of mobile phone connector unit 28 and USB connector unit 34.

A thermal protection unit 36 may be coupled with DC-to-DC converter unit 24 to provide protection against overheating by DC-to-DC converter unit 24. Thermal protection unit 36 is a safeguard against overheating of vehicle power charging system 20.

Sharing of a single DC-to-DC converter unit 24 by all output units 28, 34 promotes compact structure for vehicle power charging system 20 by avoiding a need for duplication of various components if separate DC-to-DC converter units were employed for each output unit 28, 34.

Figure 3:
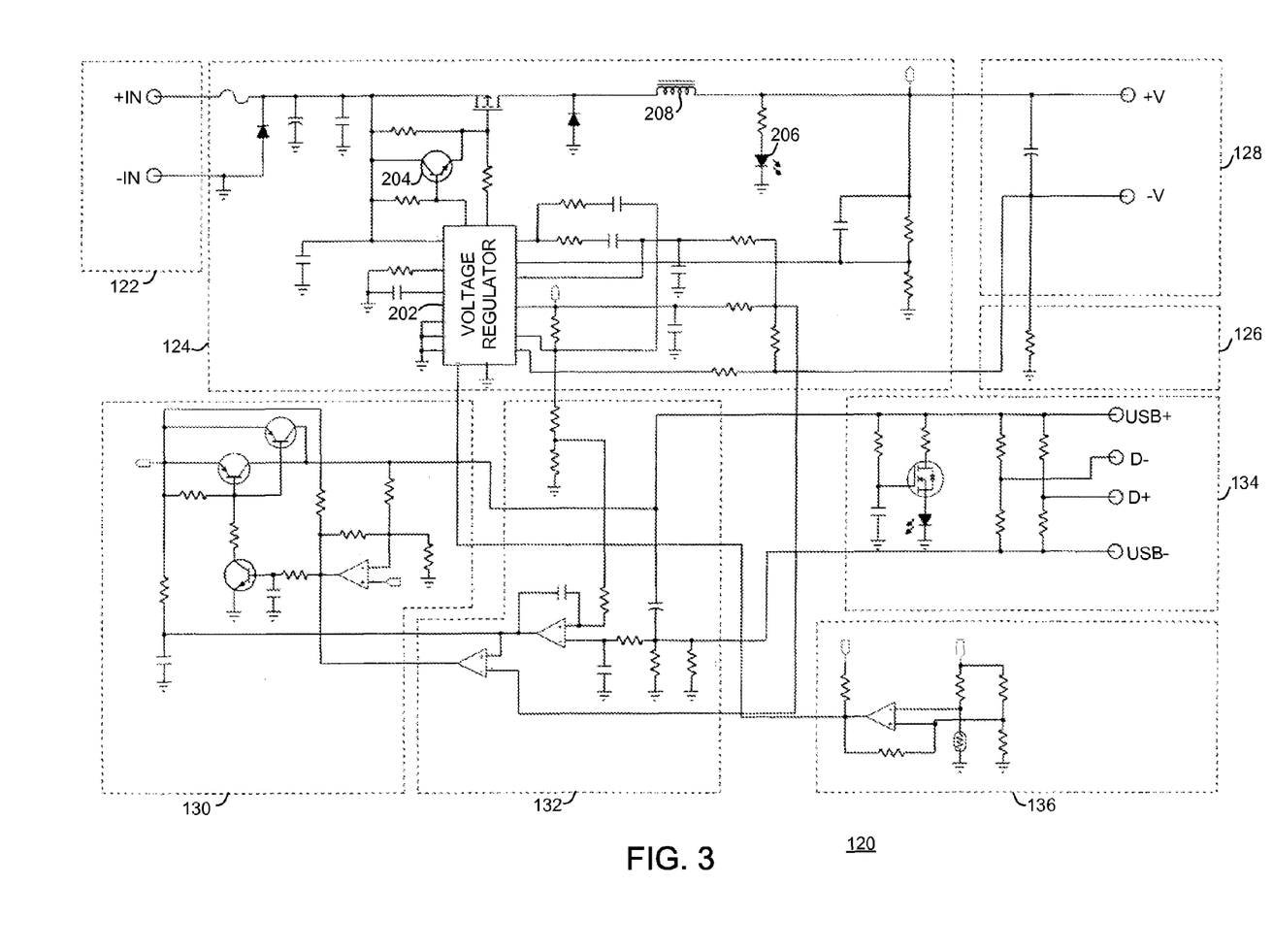
FIG. 3 is an electrical schematic diagram illustrating an embodiment of the apparatus represented in FIG. 2.

FIG. 3 is an electrical schematic diagram illustrating an embodiment of the apparatus represented in FIG. 2. In FIG. 3, a vehicle power charging system 120 is a representative embodiment of vehicle power charging system 20 (FIG. 2). Vehicle power charging system 120 includes an input unit 122 (embodying input unit 22; FIG. 2) preferably configured for insertion in a vehicle cigarette lighter socket for accessing power from a vehicle electrical system.

Structure of respective individual portions of vehicle power charging system 120 may be known by those skilled in the art of circuit design. However, the overall configuration of power charging system 120 is not obvious or otherwise known by those skilled in the art of circuit design. The knowledge of those skilled in the art of circuit design may include values of various components such as resistors, transistors, capacitors, diodes and similar components to achieve individual characteristics of respective individual portions of power charging system 120 once the novel design of power charging system 120 is disclosed. For this reason and in the interest of avoiding prolixity details regarding individual connections and component values are not specifically set out here.

Input unit 122 is coupled with a DC-to-DC converter unit 124 (embodying DC-to-DC converter unit 24; FIG. 2). DC-to-DC converter unit 124 may include a voltage regulator 202, a transistor 204, a Light Emitting Diode (LED) 206, an inductor 208 and a plurality of various resistors, transistors and capacitors and diodes to establish a voltage regulator operation. Voltage regulator 202 maybe embodied, by way of example and not by way of limitation, in a pulse width modulation voltage control circuit such as an AZ7500B/C by BCD Semiconductor Manufacturing Company or an AZ494A by Advanced Analog Circuits.

DC-to-DC converter unit 124 is coupled with a short-circuit protection unit 126 (embodying short-circuit protection unit 26; FIG. 2) and a mobile phone connector unit 128 (embodying mobile phone connector unit 28; FIG. 2). Mobile phone connector unit 128 is configured for coupling with a charging port of a mobile phone. DC-to-DC converter unit 124 is preferably configured to convert power received via input unit 122 to a voltage appropriate for mobile phone charging for presentation at mobile phone connector unit 128. Short-circuit protection unit 126 provides short-circuit protection to devices coupled with mobile phone connector unit 128.

DC-to-DC converter unit 124 is also connected with a voltage regulation unit 130 (embodying voltage regulation unit 30; FIG. 2). Voltage regulation unit 130 is coupled with a short-circuit protection unit 132 (embodying short-circuit protection unit 32; FIG. 2) and a USB connector unit 134 (embodying USB connector unit 34; FIG. 2). USB connector unit 134 is configured for coupling with a charging port of a portable electric device. USB operation may be effected according to a predetermined standard known by those ordinarily skilled in the art. Voltage regulation unit 130 is preferably configured to convert power received from DC-to-DC converter unit 124 to a voltage appropriate for USB operation for presentation at USB connector unit 134. Short-circuit protection unit 132 provides short-circuit protection to devices coupled with USB connector unit 134. Voltage regulation unit 130 may be embodied in a low-dropout voltage regulator. DC-to-DC converter unit 124 may be designed to present an output of 800 mA to 1.25 A to ensure that both phone connector unit 128 and USB connector unit 134 will have sufficient current to properly carry out charging operations, including simultaneous charging operations, when portable electrical devices are connected to both phone connector unit 128 and USB connector unit 134.

Short-circuit protection unit 126, 132 may be designed to provide different levels of protection depending upon what downstream elements are being protected. By way of example and not by way of limitation, short-circuit protection unit 126 may protect mobile phone connector unit 128 at a first level (e.g., 700 mA) in order to ensure that charging current for an attached phone will not exceed a first specified limit. Short-circuit protection unit 132 may protect USB connector unit 134 at a second level (e.g., 550 mA) in order to ensure that charging current for an attached device will not exceed a second specified limit. Independent short-circuit protection for mobile phone connector unit 128 and USB connector unit 134 may ensure that a short-circuit at one of mobile phone connector unit 128 and USB connector unit 134 will not affect operation of the other of mobile phone connector unit 128 and USB connector unit 134.

A thermal protection unit 136 (embodying thermal protection unit 36; FIG. 2) may be coupled with DC-to-DC converter unit 124 to provide protection against overheating by DC-to-DC converter unit 124. Thermal protection unit 136 is a safeguard against overheating of vehicle power charging system 120.

Sharing of a single DC-to-DC converter unit 124 by all output units 128, 134 promotes compact structure for vehicle power charging system 120 by avoiding a need for duplication of various components if separate DC-to-DC converter units were employed for each output unit 128, 134.

Figure 4:
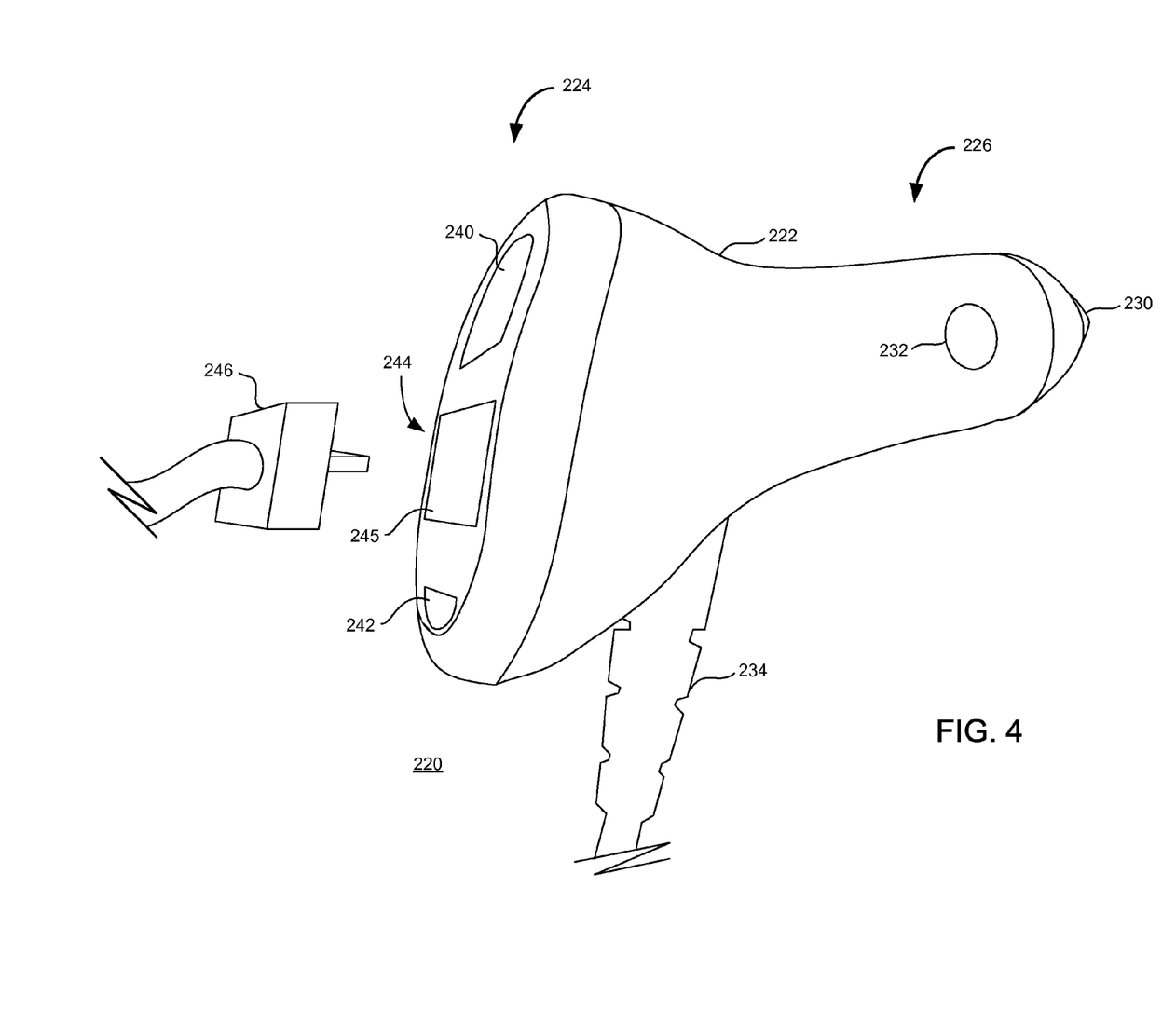
FIG. 4 is a perspective drawing of a representative apparatus configured according to the teachings of the present invention.

FIG. 4 is a perspective drawing of a representative apparatus configured according to the teachings of the present invention. In FIG. 4, a vehicle power charging system 220 embodying the present invention may be contained in a housing 222 with a first end 224 and a second end 226. Second end 226 presents connections 230, 232 to an input unit within housing 222 such as, by way of example and not by way of limitation, input unit 122 (FIG. 3). Second end 226 is preferably configured for insertion in a vehicle cigarette lighter socket (not shown) for accessing power from a vehicle electrical system. Connection 230 is deepest within a cigarette lighter socket when second end 226 is inserted into the socket and connection 232 bears against the side wall of a cigarette lighter socket when second end 226 is inserted. Connection 232 may include a second substantially similar connector on an opposite side of housing 222 (not visible in FIG. 4). One or both of connections 232 may be biased or spring loaded to resist depression within housing 222 to thereby present a force urging connection 232 against the side wall of a cigarette lighter socket when second end 226 is inserted in a vehicle cigarette lighter socket. Second end 226 is preferably configured to cooperate with a cigarette lighter socket or similar power access structure and with connection 232 to establish a firm contact between connection 232 and the wall of the power access structure when second end 226 is inserted into the power access structure.

A first power cord 234 may be attached with a mobile phone connection unit (not visible in FIG. 4) within housing 222, such as mobile phone connection unit 128 (FIG. 3). Cord 234 may be permanently attached or integrally affixed with housing 222 and a contained mobile phone connection unit. Alternatively, cord 234 may be configured for removable pluggable connection with housing 222 and a contained mobile phone connection unit.

First end 224 presents panels 240, 242 for informing a user. Either or both of panels 240, 242 may present a logo or other label and may present a lighted indication of operation of vehicle power charging system 220. First end 224 may also present a connection locus 244 for pluggably receiving a USB cable 246. Connection locus 244 may include a spring-loaded door 245 that can be urged aside when USB cable 246 is urged into a plugged-in orientation within connection locus 244. Connection locus 244 is coupled with a USB connection unit (not visible in FIG. 4) within housing 222, such as USB connection unit 134 (FIG. 3).

Figure 5:
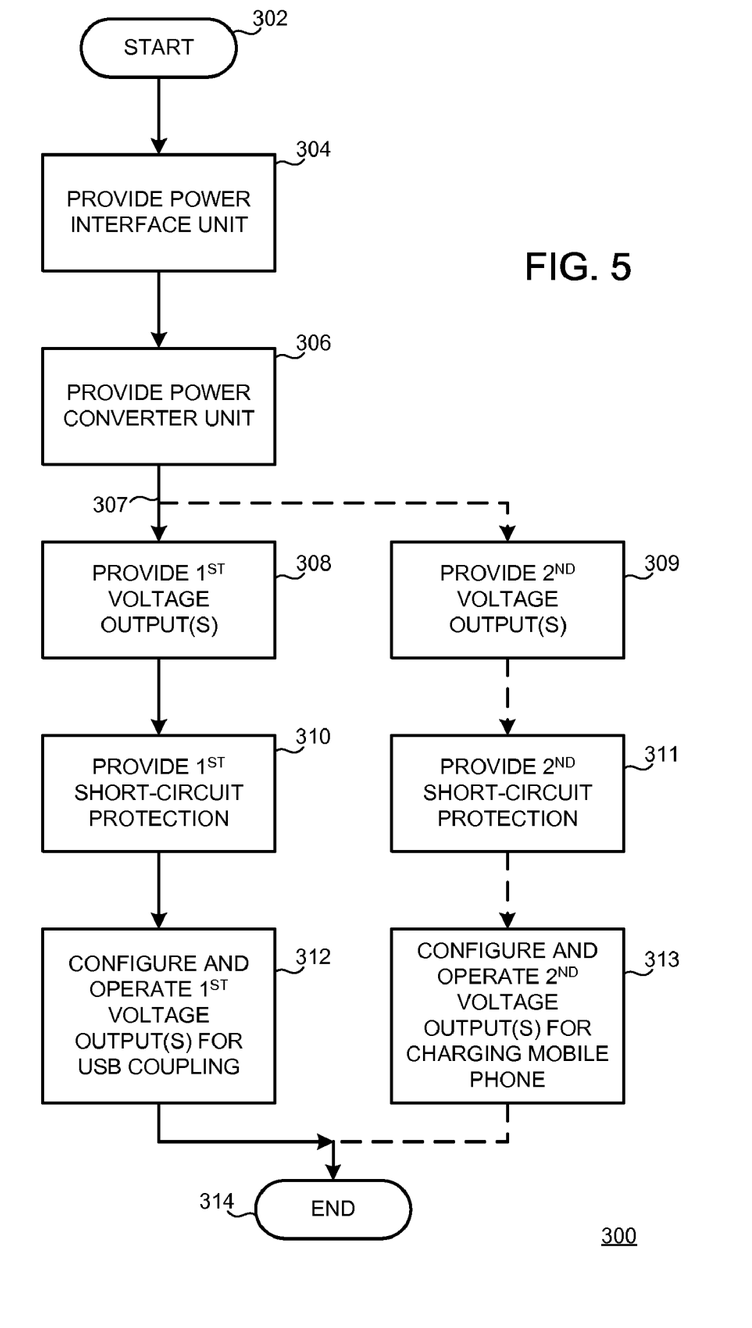
FIG. 5 is a flow chart representing the method of the present invention.

FIG. 5 is a flow chart representing the method of the present invention. In FIG. 5, a method 300 for providing power from a vehicle power source to at least one portable electrical device begins at a START locus 302. Method 300 continues with providing a power interface unit for coupling with the vehicle power source, as indicated by a block 304.

Method 300 continues with providing a power converter unit coupled with the power interface unit, as indicated by a block 306.

Method 300 continues with providing at least one first voltage output connection structure coupled with the power converter unit, as indicated by a block 308. The at least one first voltage connection structure presents at least one first voltage output.

Method 300 continues with providing first short-circuit protection circuitry coupled with the power converter unit and the at least one first voltage output connection structure, as indicated by a block 310.

Method 300 continues with configuring and operating the at least one first voltage output connection structure for effecting universal serial bus coupling, as indicated by a block 312.

Method 300 terminates at an END locus 314.

Alternatively, method 300 may further include steps beginning at a locus 307. Method 300 may provide at least one second voltage output connection structure coupled with the power converter unit, as indicated by a block 309. The at least one second voltage connection structure presents at least one second voltage output.

Method 300 continues with providing second short-circuit protection circuitry coupled with the power converter unit and the at least one second voltage output connection structure, as indicated by a block 311.

Method 300 continues with configuring and operating the at least one second voltage output connection structure for effecting coupling for charging a mobile phone, as indicated by a block 313.

Method 300 may proceed from block 313 to terminate at END locus 314.

As illustrated in FIG. 5, steps represented by blocks 309, 311, 313 may be performed in parallel with steps represented by blocks 308, 310, 312. In another alternate configuration, steps represented by blocks 309, 311, 313 may be carried out in series with steps represented by blocks 308, 310, 312 in any particular order. Performance of steps 309, 311, 313 may follow performance of steps 308, 310, 312. Performance of steps 309, 311, 313 may precede performance of steps 308, 310, 312. Performance of steps 309, 311, 313 may be alternated with or otherwise interspersed with performance of steps 308, 310, 312.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

The invention claimed is:

1. An apparatus for providing power from a vehicle power source to at least one portable electrical device; the apparatus comprising:
   (a) a housing configured for portable employment of the apparatus with different vehicles;
   (b) a power interface unit substantially contained within said housing and configured for coupling with said vehicle power source;
   (c) a power converter unit substantially contained within said housing and coupled with said power interface unit;
   (d) at least one first voltage output connection structure substantially contained within said housing and coupled with said power converter unit; said at least one first voltage connection structure presenting at least one first voltage output; said at least one first voltage output connection structure being configured for effecting universal serial bus coupling;
   (e) first short-circuit protection circuitry substantially contained within said housing and coupled with said power converter unit and said at least one first voltage output connection structures;
   (f) at least one second voltage output connection structure substantially contained within said housing and coupled with said power converter unit; said at least one second voltage connection structure presenting at least one second voltage output different from said at least one first voltage output; said at least one second voltage output connection structure being configured for effecting coupling for charging a mobile phone; and
   (g) second short-circuit protection circuitry substantially contained within said housing and coupled with said power converter unit and said at least one second voltage output connection structure.

2. The apparatus for providing power from a vehicle power source to at least one portable electrical device as recited in claim 1 wherein the apparatus further comprises:
   (g) a voltage regulation circuit substantially contained within said housing and coupled with said power converter unit and with at least one of said at least one first short circuit protection circuitry and said at least one second short circuit protection circuitry.

3. The apparatus for providing power from a vehicle power source to at least one portable electrical device as recited in claim 1 wherein the apparatus further comprises:
   (e) a voltage regulation circuit substantially contained within said housing and coupled with said power converter unit and with said at least one first short circuit protection circuitry.

4. The apparatus for providing power from a vehicle power source to at least one portable electrical device as recited in claim 1 wherein the apparatus further comprises a thermal protection unit substantially contained within said housing and coupled with said power converter unit.

5. The apparatus for providing power from a vehicle power source to at least one portable electrical device as recited in claim 4 wherein the apparatus further comprises a thermal protection unit substantially contained within said housing and coupled with said power converter unit.

6. The apparatus for providing power from a vehicle power source to at least one portable electrical device as recited in claim 2 wherein the apparatus further comprises a thermal protection unit substantially contained within said housing and coupled with said power converter unit.

7. The apparatus for providing power from a vehicle power source to at least one portable electrical device as recited in claim 3 wherein the apparatus further comprises a thermal protection unit substantially contained within said housing and coupled with said power converter unit.

8. An apparatus for providing power from a direct current power source to at least one portable direct current electrical device; the apparatus comprising:
   (a) a housing configured for portable employment of the apparatus with different direct current power sources;
   (b) a power interface unit substantially contained within said housing and configured for coupling with said direct current power source;
   (c) a direct current-to-direct current power converter unit substantially contained within said housing and coupled with said power interface unit;
   (d) at least one first voltage output connection structure substantially contained within said housing and coupled with said power converter unit; said at least one first voltage connection structure presenting at least one first voltage output; said at least one first voltage output connection structure being configured for effecting universal serial bus coupling;
   (e) first short-circuit protection circuitry substantially contained within said housing and coupled with said power converter unit and said at least one first voltage output connection structures;
   (f) at least one second voltage output connection structure substantially contained within said housing and coupled with said power converter unit; said at least one second voltage connection structure presenting at least one second voltage output different from said at least one first voltage output; said at least one second voltage output connection structure being configured for effecting coupling for charging a mobile phone; and
   (g) second short-circuit protection circuitry substantially contained within said housing and coupled with said power converter unit and said at least one second voltage output connection structure.

9. The apparatus for providing power from a direct current power source to at least one portable direct current electrical device as recited in claim 8 wherein the apparatus further comprises:
   (g) a voltage regulation circuit substantially contained within said housing and coupled with said power converter unit and with at least one of said at least one first short circuit protection circuitry and said at least one second short circuit protection circuitry.

10. The apparatus for providing power from a direct current power source to at least one portable direct current electrical device as recited in claim 8 wherein the apparatus further comprises:
    (e) a voltage regulation circuit substantially contained within said housing and coupled with said power converter unit and with said at least one first short circuit protection circuitry.

11. The apparatus for providing power from a direct current power source to at least one portable direct current electrical device as recited in claim 8 wherein the apparatus further comprises a thermal protection unit substantially contained within said housing and coupled with said power converter unit.

12. The apparatus for providing power from a direct current power source to at least one portable direct current electrical device as recited in claim 9 wherein the apparatus further comprises a thermal protection unit substantially contained within said housing and coupled with said power converter unit.

13. The apparatus for providing power from a direct current power source to at least one portable direct current electrical device as recited in claim 10 wherein the apparatus further comprises a thermal protection unit substantially contained within said housing and coupled with said power converter unit.

14. A method for providing power from a vehicle power source to at least one portable electrical device; the method comprising:
    (a) providing a housing configured for portable employment with different vehicles;
    (b) providing a power interface unit substantially contained within said housing and configured for coupling with said vehicle power source;
    (c) providing a power converter unit substantially contained within said housing and coupled with said power interface unit;
    (d) providing at least one first voltage output connection structure substantially contained within said housing and coupled with said power converter unit; said at least one first voltage connection structure presenting at least one first voltage output;
    (e) providing first short-circuit protection circuitry substantially contained within said housing and coupled with said power converter unit and said at least one first voltage output connection structure;
    (f) configuring and operating said at least one first voltage output connection structure for effecting universal serial bus coupling
    (g) providing at least one second voltage output connection structure substantially contained within said housing and coupled with said power converter unit; said at least one second voltage connection structure presenting at least one second voltage output different from said at least one first voltage output;
    (h) providing second short-circuit protection circuitry substantially contained within said housing and coupled with said power converter unit and said at least one second voltage output connection structure; and
    (i) configuring and operating said at least one second voltage output connection structure for effecting coupling for charging a mobile phone.

15. The method for providing power from a vehicle power source to at least one portable electrical device as recited in claim 14 wherein the method further comprises:
    (g) providing a voltage regulation circuit substantially contained within said housing and coupled with said power converter unit and with at least one of said at least one first short circuit protection circuitry and said at least one second short circuit protection circuitry.

16. The method for providing power from a vehicle power source to at least one portable electrical device as recited in claim 14 wherein the method further comprises providing a thermal protection unit substantially contained within said housing and coupled with said power converter unit.

\* \* \* \* \*